(12) United States Patent
Forstall et al.

(10) Patent No.: US 8,332,402 B2
(45) Date of Patent: Dec. 11, 2012

(54) LOCATION BASED MEDIA ITEMS

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 12/020,202

(22) Filed: Jan. 25, 2008

(65) Prior Publication Data

US 2009/0006336 A1 Jan. 1, 2009

Related U.S. Application Data

(60) Provisional application No. 60/946,840, filed on Jun. 28, 2007.

(51) Int. Cl.
*G06F 17/30* (2006.01)

(52) U.S. Cl. .................... 707/736; 707/737; 707/899

(58) Field of Classification Search .................. None
See application file for complete search history.

(56) References Cited

U.S. PATENT DOCUMENTS

| | | | |
|---|---|---|---|
| 4,644,351 A | 2/1987 | Zabarsky et al. |
| 4,903,212 A | 2/1990 | Yokouchi et al. |
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Toneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |

(Continued)

FOREIGN PATENT DOCUMENTS

BR 9904979 12/2000

(Continued)

OTHER PUBLICATIONS

U.S. Appl. No. 11/464,671, filed Aug. 15, 2006, Johnson.

(Continued)

*Primary Examiner* — Hung Q Pham

(74) *Attorney, Agent, or Firm* — Fish & Richardson P.C.

(57) ABSTRACT

Media items can be distributed to mobile devices based on the location of the media device. The media items can be associated with location information, which can be examined and distributed to those devices whose proximate area includes the location information associated with the media items.

40 Claims, 7 Drawing Sheets

U.S. PATENT DOCUMENTS

| | | |
|---|---|---|
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw |
| 5,630,206 A | 5/1997 | Urban et al. |
| 5,636,245 A | 6/1997 | Ernst |
| 5,642,303 A | 6/1997 | Small |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,774,824 A | 6/1998 | Streit et al. |
| 5,774,829 A | 6/1998 | Cisneros et al. |
| 5,793,630 A | 8/1998 | Theimer |
| 5,796,365 A | 8/1998 | Lewis et al. |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |

| Patent | Type | Date | Inventor |
|---|---|---|---|
| 6,199,014 | B1 | 3/2001 | Walker |
| 6,199,045 | B1 | 3/2001 | Giniger et al. |
| 6,199,099 | B1 | 3/2001 | Gershman et al. |
| 6,202,008 | B1 | 3/2001 | Beckert et al. |
| 6,202,023 | B1 | 3/2001 | Hancock et al. |
| 6,208,866 | B1 | 3/2001 | Rouhollahzadeh et al. |
| 6,212,473 | B1 | 4/2001 | Stefan et al. |
| 6,216,086 | B1 | 4/2001 | Seymour et al. |
| 6,222,483 | B1 | 4/2001 | Twitchell et al. |
| 6,233,518 | B1 | 5/2001 | Lee |
| 6,236,365 | B1 | 5/2001 | LeBlanc et al. |
| 6,236,933 | B1 | 5/2001 | Lang |
| 6,246,948 | B1 | 6/2001 | Thakker |
| 6,249,252 | B1 | 6/2001 | Dupray |
| 6,252,543 | B1 | 6/2001 | Camp |
| 6,252,544 | B1 | 6/2001 | Hoffberg |
| 6,256,498 | B1 | 7/2001 | Ludwig |
| 6,259,405 | B1 | 7/2001 | Stewart et al. |
| 6,266,612 | B1 | 7/2001 | Dussell et al. |
| 6,266,614 | B1 | 7/2001 | Alumbaugh |
| 6,266,615 | B1 | 7/2001 | Jin |
| 6,272,342 | B1 | 8/2001 | Havinis et al. |
| 6,278,884 | B1 | 8/2001 | Kim |
| 6,281,807 | B1 | 8/2001 | Kynast et al. |
| 6,282,491 | B1 | 8/2001 | Bochmann et al. |
| 6,282,496 | B1 | 8/2001 | Chowdhary |
| 6,295,454 | B1 | 9/2001 | Havinis et al. |
| 6,298,306 | B1 | 10/2001 | Suarez et al. |
| 6,304,758 | B1 | 10/2001 | Iierbig et al. |
| 6,313,761 | B1 | 11/2001 | Shinada |
| 6,314,369 | B1 | 11/2001 | Ito et al. |
| 6,314,406 | B1 | 11/2001 | O'Hagan et al. |
| 6,317,684 | B1 | 11/2001 | Roeseler et al. |
| 6,321,158 | B1 | 11/2001 | DeLorme et al. |
| 6,323,846 | B1 | 11/2001 | Westerman et al. |
| 6,324,692 | B1 | 11/2001 | Fiske |
| 6,326,918 | B1 | 12/2001 | Stewart |
| 6,332,127 | B1 | 12/2001 | Bandera et al. |
| 6,339,437 | B1 | 1/2002 | Nielsen |
| 6,339,746 | B1 | 1/2002 | Sugiyama et al. |
| 6,343,317 | B1 | 1/2002 | Glorikian |
| 6,345,288 | B1 | 2/2002 | Reed et al. |
| 6,351,235 | B1 | 2/2002 | Stilp |
| 6,353,398 | B1 | 3/2002 | Amin et al. |
| 6,353,743 | B1 | 3/2002 | Karmel |
| 6,353,837 | B1 | 3/2002 | Blumenau |
| 6,356,761 | B1 | 3/2002 | Huttunen |
| 6,356,763 | B1 | 3/2002 | Kangas et al. |
| 6,356,836 | B1 | 3/2002 | Adolph |
| 6,356,838 | B1 | 3/2002 | Paul |
| 6,370,629 | B1 | 4/2002 | Hastings et al. |
| 6,377,886 | B1 | 4/2002 | Gotou |
| 6,381,465 | B1 | 4/2002 | Chern et al. |
| 6,381,539 | B1 | 4/2002 | Shimazu |
| 6,381,603 | B1 | 4/2002 | Chan et al. |
| 6,385,458 | B1 | 5/2002 | Papadimitriou et al. |
| 6,385,465 | B1 | 5/2002 | Yoshioka |
| 6,385,535 | B2 | 5/2002 | Ohishi et al. |
| 6,389,288 | B1 | 5/2002 | Kuwahara et al. |
| 6,401,032 | B1 | 6/2002 | Jamison |
| 6,405,034 | B1 | 6/2002 | Tijerino |
| 6,405,123 | B1 | 6/2002 | Rennar et al. |
| 6,411,899 | B2 | 6/2002 | Dussell et al. |
| 6,414,635 | B1 | 7/2002 | Stewart et al. |
| 6,415,207 | B1 | 7/2002 | Jones |
| 6,415,220 | B1 | 7/2002 | Kovacs |
| 6,415,227 | B1 | 7/2002 | Lin |
| 6,427,115 | B1 | 7/2002 | Sekiyama |
| 6,430,411 | B1 | 8/2002 | Lempio et al. |
| 6,434,530 | B1 | 8/2002 | Sloane et al. |
| 6,438,490 | B2 | 8/2002 | Ohta |
| 6,449,485 | B1 | 9/2002 | Anzil |
| 6,452,498 | B2 | 9/2002 | Stewart |
| 6,456,234 | B1 | 9/2002 | Johnson |
| 6,456,956 | B1 | 9/2002 | Xiong |
| 6,459,782 | B1 | 10/2002 | Bedrosian et al. |
| 6,463,289 | B1 | 10/2002 | Havinis et al. |
| 6,477,581 | B1 | 11/2002 | Carpenter |
| 6,487,305 | B2 | 11/2002 | Kambe et al. |
| 6,490,454 | B1 | 12/2002 | Kangas et al. |
| 6,490,519 | B1 | 12/2002 | Lapidot et al. |
| 6,501,421 | B1 | 12/2002 | Dutta et al. |
| 6,505,046 | B1 | 1/2003 | Baker |
| 6,505,048 | B1 | 1/2003 | Moles et al. |
| 6,505,123 | B1 | 1/2003 | Root et al. |
| 6,507,802 | B1 | 1/2003 | Payton et al. |
| 6,516,197 | B2 | 2/2003 | Havinis et al. |
| 6,519,463 | B2 | 2/2003 | Tendler |
| 6,526,335 | B1 | 2/2003 | Treyz et al. |
| 6,529,143 | B2 | 3/2003 | Mikkola et al. |
| 6,535,140 | B1 | 3/2003 | Goss et al. |
| 6,542,812 | B1 | 4/2003 | Obradovich et al. |
| 6,542,819 | B1 | 4/2003 | Kovacs et al. |
| 6,546,360 | B1 | 4/2003 | Gilbert et al. |
| 6,552,682 | B1 | 4/2003 | Fan |
| 6,563,430 | B1 | 5/2003 | Kemink et al. |
| 6,564,143 | B1 | 5/2003 | Alewine et al. |
| 6,570,557 | B1 | 5/2003 | Westerman et al. |
| 6,571,279 | B1 | 5/2003 | Herz et al. |
| 6,574,484 | B1 | 6/2003 | Carley |
| 6,587,688 | B1 | 7/2003 | Chambers et al. |
| 6,587,782 | B1 | 7/2003 | Nocek et al. |
| 6,587,835 | B1 | 7/2003 | Treyz et al. |
| 6,594,480 | B1 | 7/2003 | Montalvo et al. |
| 6,597,305 | B2 | 7/2003 | Szeto et al. |
| 6,611,687 | B1 | 8/2003 | Clark et al. |
| 6,611,788 | B1 | 8/2003 | Hussa |
| 6,615,131 | B1 | 9/2003 | Rennard et al. |
| 6,615,213 | B1 | 9/2003 | Johnson |
| 6,647,257 | B2 | 11/2003 | Owensby |
| 6,650,902 | B1 | 11/2003 | Richton |
| 6,650,997 | B2 | 11/2003 | Funk |
| 6,662,016 | B1 | 12/2003 | Buckham et al. |
| 6,662,023 | B1 | 12/2003 | Helle |
| 6,667,963 | B1 | 12/2003 | Rantalainen et al. |
| 6,671,377 | B1 | 12/2003 | Havinis et al. |
| 6,674,849 | B1 | 1/2004 | Froeberg |
| 6,677,894 | B1 | 1/2004 | Sheynblat et al. |
| 6,678,516 | B2 | 1/2004 | Nordman et al. |
| 6,679,932 | B2 | 1/2004 | Birler et al. |
| 6,680,694 | B1 | 1/2004 | Knockeart et al. |
| 6,681,120 | B1 | 1/2004 | Kim |
| 6,683,538 | B1 | 1/2004 | Wilkes, Jr. |
| 6,697,018 | B2 | 2/2004 | Stewart |
| 6,697,734 | B1 | 2/2004 | Suomela |
| 6,711,408 | B1 | 3/2004 | Raith |
| 6,711,474 | B1 | 3/2004 | Treyz et al. |
| 6,714,791 | B2 | 3/2004 | Friedman |
| 6,718,344 | B2 | 4/2004 | Hirono |
| 6,721,572 | B1 | 4/2004 | Smith et al. |
| 6,731,236 | B1 | 5/2004 | Hager et al. |
| 6,731,238 | B1 | 5/2004 | Johnson |
| 6,732,047 | B1 | 5/2004 | de Silva |
| 6,738,808 | B1 | 5/2004 | Zellner et al. |
| 6,741,188 | B1 | 5/2004 | Miller et al. |
| 6,741,926 | B1 | 5/2004 | Zhao et al. |
| 6,748,226 | B1 | 6/2004 | Wortham |
| 6,748,318 | B1 | 6/2004 | Jones |
| 6,750,883 | B1 | 6/2004 | Parupudi et al. |
| 6,759,960 | B2 | 7/2004 | Stewart |
| 6,762,772 | B1 | 7/2004 | Imamura et al. |
| 6,766,174 | B1 | 7/2004 | Kenyon |
| 6,781,575 | B1 | 8/2004 | Hawkins et al. |
| 6,782,278 | B2 | 8/2004 | Chen et al. |
| 6,789,012 | B1 | 9/2004 | Childs et al. |
| 6,795,686 | B1 | 9/2004 | Master et al. |
| 6,801,855 | B1 | 10/2004 | Walters et al. |
| 6,810,323 | B1 | 10/2004 | Bullock et al. |
| 6,813,501 | B2 | 11/2004 | Kinnunen et al. |
| 6,813,503 | B1 | 11/2004 | Zillikens et al. |
| 6,816,782 | B1 | 11/2004 | Walters et al. |
| 6,819,919 | B1 | 11/2004 | Tanaka |
| 6,823,188 | B1 | 11/2004 | Stern |
| 6,834,195 | B2 | 12/2004 | Brandenberg et al. |
| 6,845,318 | B1 | 1/2005 | Moore et al. |
| 6,847,891 | B2 | 1/2005 | Pietras et al. |
| 6,847,969 | B1 | 1/2005 | Mathai et al. |
| 6,853,911 | B1 | 2/2005 | Sakarya |

| Patent No. | Date | Inventor |
|---|---|---|
| 6,853,917 B2 | 2/2005 | Miwa |
| 6,859,149 B1 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,933,841 B2 | 8/2005 | Muramatsu et al. |
| 6,944,447 B2 | 9/2005 | Portman et al. |
| 6,948,656 B2 | 9/2005 | Williams |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,076,255 B2 | 7/2006 | Parupudi et al. |
| 7,082,365 B2 * | 7/2006 | Sheha et al. ............ 701/209 |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,146,298 B2 | 12/2006 | Motamedi et al. |
| 7,149,503 B1 | 12/2006 | Aarnio et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,236,883 B2 | 6/2007 | Garin et al. |
| 7,254,481 B2 * | 8/2007 | Yamada et al. ............ 701/208 |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,403 B2 | 9/2007 | Creamer et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,556 B2 | 11/2007 | Roese et al. |
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti |
| 7,313,467 B2 | 12/2007 | Breed et al. |
| 7,319,412 B1 | 1/2008 | Coppinger et al. |
| 7,336,928 B2 | 2/2008 | Paalasmaa et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B2 | 9/2008 | Kemper et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,536,388 B2 | 5/2009 | Jung et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,593,740 B2 | 9/2009 | Crowley et al. |
| 7,593,991 B2 | 9/2009 | Friedman et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagaa et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,729,691 B2 | 6/2010 | Newville |
| 7,739,040 B2 | 6/2010 | Horvitz |
| 7,743,074 B1 | 6/2010 | Parupudi et al. |
| 7,756,639 B2 | 7/2010 | Colley et al. |
| 7,768,395 B2 | 8/2010 | Gold |
| 7,792,273 B2 | 9/2010 | Fano et al. |
| 7,811,203 B2 | 10/2010 | Unuma et al. |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 7,941,188 B2 | 5/2011 | Jung et al. |
| 7,991,432 B2 | 8/2011 | Silverbrook et al. |
| 8,036,630 B2 | 10/2011 | Park et al. |
| 8,046,009 B2 | 10/2011 | Bodmer et al. |
| 2001/0018349 A1 | 8/2001 | Kinnunen et al. |
| 2001/0046884 A1 | 11/2001 | Yoshioka |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0055373 A1 | 5/2002 | King et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091991 A1 | 7/2002 | Castro |
| 2002/0095486 A1 | 7/2002 | Bahl |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0167442 A1 | 11/2002 | Taylor |
| 2002/0173905 A1 | 11/2002 | Jin et al. |
| 2003/0014181 A1 | 1/2003 | Myr |
| 2003/0016804 A1 | 1/2003 | Sheha et al. |

| | | | | | | |
|---|---|---|---|---|---|---|
| 2003/0032404 A1 | 2/2003 | Wager et al. | | 2005/0134440 A1 | 6/2005 | Breed |
| 2003/0055560 A1 | 3/2003 | Phillips et al. | | 2005/0134578 A1 | 6/2005 | Chambers et al. |
| 2003/0060212 A1 | 3/2003 | Thomas | | 2005/0149250 A1 | 7/2005 | Isaac |
| 2003/0060215 A1 | 3/2003 | Graham | | 2005/0153681 A1 | 7/2005 | Hanson |
| 2003/0060973 A1 | 3/2003 | Mathews et al. | | 2005/0176411 A1 | 8/2005 | Taya |
| 2003/0060976 A1 | 3/2003 | Sato et al. | | 2005/0186954 A1 | 8/2005 | Kenney |
| 2003/0065934 A1 | 4/2003 | Angelo et al. | | 2005/0192025 A1 | 9/2005 | Kaplan |
| 2003/0069029 A1 | 4/2003 | Dowling et al. | | 2005/0197767 A1 | 9/2005 | Nortrup |
| 2003/0069683 A1 | 4/2003 | Lapidot et al. | | 2005/0203698 A1 | 9/2005 | Lee |
| 2003/0078054 A1 | 4/2003 | Okuda | | 2005/0221799 A1 | 10/2005 | Tervo et al. |
| 2003/0078055 A1 | 4/2003 | Smith et al. | | 2005/0221808 A1 | 10/2005 | Karlsson et al. |
| 2003/0078057 A1 | 4/2003 | Watanabe et al. | | 2005/0221843 A1 | 10/2005 | Friedman et al. |
| 2003/0093217 A1 | 5/2003 | Petzold et al. | | 2005/0222756 A1 | 10/2005 | Davis et al. |
| 2003/0096620 A1 | 5/2003 | Ozturk et al. | | 2005/0222763 A1 | 10/2005 | Uyeki |
| 2003/0100326 A1 | 5/2003 | Grube et al. | | 2005/0227709 A1 | 10/2005 | Chang et al. |
| 2003/0100334 A1 | 5/2003 | Mazzara, Jr. | | 2005/0228860 A1 | 10/2005 | Hamynen et al. |
| 2003/0101225 A1 | 5/2003 | Han et al. | | 2005/0234637 A1 | 10/2005 | Obradovich et al. |
| 2003/0120423 A1 | 6/2003 | Cochlovius et al. | | 2005/0239477 A1 | 10/2005 | Kim et al. |
| 2003/0134657 A1 | 7/2003 | Norta et al. | | 2005/0250440 A1 | 11/2005 | Zhou et al. |
| 2003/0140136 A1 | 7/2003 | Nakamura | | 2005/0256639 A1 | 11/2005 | Aleksic et al. |
| 2003/0144793 A1 | 7/2003 | Melaku et al. | | 2005/0286421 A1 | 12/2005 | Janacek |
| 2003/0148774 A1 | 8/2003 | Naghian et al. | | 2006/0009908 A1 | 1/2006 | Tomita et al. |
| 2003/0158655 A1 | 8/2003 | Obradovich et al. | | 2006/0015249 A1 | 1/2006 | Gieseke |
| 2003/0191578 A1 | 10/2003 | Paulauskas et al. | | 2006/0022048 A1 | 2/2006 | Johnson |
| 2003/0236106 A1 | 12/2003 | Master et al. | | 2006/0025158 A1 | 2/2006 | Leblanc et al. |
| 2004/0010358 A1 | 1/2004 | Oesterling et al. | | 2006/0029109 A1 | 2/2006 | Moran |
| 2004/0036649 A1 | 2/2004 | Taylor | | 2006/0038719 A1 | 2/2006 | Pande et al. |
| 2004/0054428 A1 | 3/2004 | Sheha et al. | | 2006/0041374 A1 | 2/2006 | Inoue |
| 2004/0059502 A1 | 3/2004 | Levi et al. | | 2006/0041377 A1 | 2/2006 | Jung et al. |
| 2004/0068439 A1 | 4/2004 | Elgrably | | 2006/0041378 A1 | 2/2006 | Cheng et al. |
| 2004/0072577 A1 | 4/2004 | Myllymaki et al. | | 2006/0056388 A1 | 3/2006 | Livinwood |
| 2004/0073361 A1 | 4/2004 | Tzamaloukas et al. | | 2006/0058955 A1 | 3/2006 | Mehren |
| 2004/0082351 A1 | 4/2004 | Westman | | 2006/0063539 A1 | 3/2006 | Beyer, Jr. |
| 2004/0083050 A1 | 4/2004 | Biyani | | 2006/0068809 A1 | 3/2006 | Wengler et al. |
| 2004/0093155 A1 | 5/2004 | Simonds | | 2006/0069503 A1 | 3/2006 | Suomela |
| 2004/0104842 A1 | 6/2004 | Drury et al. | | 2006/0085392 A1 | 4/2006 | Wang et al. |
| 2004/0110515 A1 | 6/2004 | Blumberg et al. | | 2006/0094353 A1 | 5/2006 | Nielsen et al. |
| 2004/0128067 A1 | 7/2004 | Smith | | 2006/0101005 A1 | 5/2006 | Yang et al. |
| 2004/0151151 A1 | 8/2004 | Kubler et al. | | 2006/0111122 A1 | 5/2006 | Carlsan et al. |
| 2004/0158401 A1 | 8/2004 | Yoon | | 2006/0116137 A1 | 6/2006 | Jung |
| 2004/0158584 A1 | 8/2004 | Necsoiu et al. | | 2006/0148463 A1 | 7/2006 | Zhu et al. |
| 2004/0172409 A1 | 9/2004 | James | | 2006/0149461 A1 | 7/2006 | Rowley |
| 2004/0176907 A1 | 9/2004 | Nesbitt | | 2006/0150119 A1* | 7/2006 | Chesnais et al. ............... 715/810 |
| 2004/0180669 A1 | 9/2004 | Kall | | 2006/0166679 A1 | 7/2006 | Karaoguz et al. |
| 2004/0192299 A1 | 9/2004 | Wilson et al. | | 2006/0168300 A1 | 7/2006 | An et al. |
| 2004/0198335 A1 | 10/2004 | Campen | | 2006/0172769 A1 | 8/2006 | Oh |
| 2004/0198379 A1 | 10/2004 | Magee et al. | | 2006/0172778 A1 | 8/2006 | Sundararajan et al. |
| 2004/0198397 A1 | 10/2004 | Weiss | | 2006/0179114 A1 | 8/2006 | Deeds |
| 2004/0203569 A1 | 10/2004 | Jijina et al. | | 2006/0180649 A1 | 8/2006 | Casey |
| 2004/0203746 A1 | 10/2004 | Knauerhase et al. | | 2006/0184978 A1 | 8/2006 | Casey |
| 2004/0203836 A1 | 10/2004 | Gorday et al. | | 2006/0195481 A1 | 8/2006 | Arrouye et al. |
| 2004/0203880 A1 | 10/2004 | Riley | | 2006/0199567 A1 | 9/2006 | Alston |
| 2004/0203909 A1 | 10/2004 | Koster | | 2006/0202819 A1 | 9/2006 | Adamczyk et al. |
| 2004/0215707 A1 | 10/2004 | Fujita et al. | | 2006/0211453 A1 | 9/2006 | Schick |
| 2004/0225436 A1 | 11/2004 | Yoshihashi | | 2006/0218209 A1 | 9/2006 | Arrouye et al. |
| 2004/0228330 A1 | 11/2004 | Kubler et al. | | 2006/0227047 A1 | 10/2006 | Rosenberg |
| 2004/0236504 A1 | 11/2004 | Bickford et al. | | 2006/0229802 A1 | 10/2006 | Vertelney et al. |
| 2004/0242149 A1 | 12/2004 | Luneau | | 2006/0247855 A1 | 11/2006 | de Silva et al. |
| 2004/0246940 A1 | 12/2004 | Kubler et al. | | 2006/0251034 A1 | 11/2006 | Park |
| 2004/0248586 A1 | 12/2004 | Patel et al. | | 2006/0270421 A1 | 11/2006 | Phillips et al. |
| 2004/0260939 A1 | 12/2004 | Ichikawa et al. | | 2006/0271280 A1 | 11/2006 | O'Clair |
| 2004/0263084 A1 | 12/2004 | Mor et al. | | 2006/0284767 A1 | 12/2006 | Taylor |
| 2004/0264442 A1 | 12/2004 | Kubler et al. | | 2006/0287824 A1 | 12/2006 | Lin |
| 2005/0002419 A1 | 1/2005 | Doviak et al. | | 2006/0291639 A1 | 12/2006 | Radziewicz et al. |
| 2005/0004838 A1 | 1/2005 | Perkowski et al. | | 2006/0293029 A1 | 12/2006 | Jha et al. |
| 2005/0009511 A1 | 1/2005 | Bostrom et al. | | 2006/0293083 A1 | 12/2006 | Bowen |
| 2005/0027442 A1 | 2/2005 | Kelley et al. | | 2007/0001875 A1 | 1/2007 | Taylor |
| 2005/0033515 A1 | 2/2005 | Bozzone | | 2007/0003040 A1 | 1/2007 | Radziewicz et al. |
| 2005/0037781 A1 | 2/2005 | Ozugur et al. | | 2007/0005188 A1 | 1/2007 | Johnson |
| 2005/0039140 A1 | 2/2005 | Chen | | 2007/0005233 A1 | 1/2007 | Pinkus et al. |
| 2005/0046584 A1 | 3/2005 | Breed | | 2007/0006098 A1 | 1/2007 | Krumm et al. |
| 2005/0071078 A1 | 3/2005 | Yamada et al. | | 2007/0008515 A1 | 1/2007 | Otani et al. |
| 2005/0071702 A1 | 3/2005 | Morisawa | | 2007/0010942 A1 | 1/2007 | Bill |
| 2005/0075116 A1 | 4/2005 | Laird | | 2007/0016362 A1 | 1/2007 | Nelson |
| 2005/0085272 A1 | 4/2005 | Anderson et al. | | 2007/0027614 A1 | 2/2007 | Reeser et al. |
| 2005/0091408 A1 | 4/2005 | Parupudi et al. | | 2007/0027628 A1 | 2/2007 | Geelen |
| 2005/0096840 A1 | 5/2005 | Simske | | 2007/0042790 A1 | 2/2007 | Mohi et al. |
| 2005/0114021 A1 | 5/2005 | Krull et al. | | 2007/0055684 A1 | 3/2007 | Steven |
| 2005/0130677 A1 | 6/2005 | Meunier et al. | | 2007/0060328 A1 | 3/2007 | Zrike et al. |

| | | | | | | |
|---|---|---|---|---|---|---|
| 2007/0061245 A1 | 3/2007 | Ramer et al. | 2008/0086240 A1 | 4/2008 | Breed | |
| 2007/0061301 A1 | 3/2007 | Ramer et al. | 2008/0088486 A1 | 4/2008 | Rozum et al. | |
| 2007/0061363 A1 | 3/2007 | Ramer et al. | 2008/0091347 A1 | 4/2008 | Tashiro | |
| 2007/0071114 A1 | 3/2007 | Sanderford et al. | 2008/0096518 A1 | 4/2008 | Mock et al. | |
| 2007/0073480 A1 | 3/2007 | Singh | 2008/0097698 A1 | 4/2008 | Arnold-Huyser et al. | |
| 2007/0073719 A1 | 3/2007 | Ramer et al. | 2008/0098090 A1 | 4/2008 | Geraci et al. | |
| 2007/0087726 A1 | 4/2007 | McGary et al. | 2008/0104634 A1 | 5/2008 | Gajdos et al. | |
| 2007/0093258 A1 | 4/2007 | Steenstra et al. | 2008/0109153 A1 | 5/2008 | Gueziec | |
| 2007/0106465 A1 | 5/2007 | Adam et al. | 2008/0113672 A1 | 5/2008 | Karr et al. | |
| 2007/0115868 A1 | 5/2007 | Chen et al. | 2008/0129528 A1 | 6/2008 | Guthrie | |
| 2007/0124043 A1 | 5/2007 | Ayoub et al. | 2008/0132243 A1 | 6/2008 | Spalink et al. | |
| 2007/0124058 A1 | 5/2007 | Kitagawa et al. | 2008/0132251 A1 | 6/2008 | Altman et al. | |
| 2007/0124066 A1 | 5/2007 | Kikuchi | 2008/0132252 A1 | 6/2008 | Altman et al. | |
| 2007/0127661 A1 | 6/2007 | Didcock | 2008/0140308 A1 | 6/2008 | Yamane et al. | |
| 2007/0129888 A1 | 6/2007 | Rosenberg | 2008/0140520 A1 | 6/2008 | Hyder et al. | |
| 2007/0130153 A1 | 6/2007 | Nachman et al. | 2008/0153512 A1 | 6/2008 | Kale et al. | |
| 2007/0135136 A1 | 6/2007 | Ische | 2008/0153513 A1 | 6/2008 | Flake et al. | |
| 2007/0135990 A1 | 6/2007 | Seymour et al. | 2008/0155453 A1 | 6/2008 | Othmer | |
| 2007/0142026 A1 | 6/2007 | Kuz et al. | 2008/0160956 A1 | 7/2008 | Jackson et al. | |
| 2007/0149212 A1 | 6/2007 | Gupta et al. | 2008/0161034 A1 | 7/2008 | Akiyama | |
| 2007/0150320 A1 | 6/2007 | Huang | 2008/0167083 A1 | 7/2008 | Wyld et al. | |
| 2007/0153983 A1 | 7/2007 | Bloebaum et al. | 2008/0167796 A1 | 7/2008 | Narayanaswami | |
| 2007/0153984 A1 | 7/2007 | Bloebaum et al. | 2008/0167811 A1 | 7/2008 | Geelen | |
| 2007/0153986 A1 | 7/2007 | Bloebaum et al. | 2008/0172173 A1 | 7/2008 | Chang et al. | |
| 2007/0155360 A1 | 7/2007 | An | 2008/0172374 A1 | 7/2008 | Wolosin et al. | |
| 2007/0156326 A1 | 7/2007 | Nesbitt | 2008/0176545 A1 | 7/2008 | Dicke et al. | |
| 2007/0162224 A1 | 7/2007 | Luo | 2008/0177793 A1 | 7/2008 | Epstein et al. | |
| 2007/0179854 A1 | 8/2007 | Ziv et al. | 2008/0178116 A1 | 7/2008 | Kim | |
| 2007/0184855 A1 | 8/2007 | Klassen | 2008/0186162 A1 | 8/2008 | Rajan et al. | |
| 2007/0191029 A1 | 8/2007 | Zarem et al. | 2008/0189033 A1 | 8/2008 | Geelen et al. | |
| 2007/0200713 A1 | 8/2007 | Weber et al. | 2008/0194273 A1 | 8/2008 | Kansal et al. | |
| 2007/0204218 A1 | 8/2007 | Weber et al. | 2008/0200142 A1 | 8/2008 | Abdel-Kader et al. | |
| 2007/0206730 A1 | 9/2007 | Polk | 2008/0207167 A1 | 8/2008 | Bugenhagen | |
| 2007/0208492 A1 | 9/2007 | Downs et al. | 2008/0225779 A1 | 9/2008 | Bragiel et al. | |
| 2007/0208497 A1 | 9/2007 | Downs et al. | 2008/0227473 A1 | 9/2008 | Haney | |
| 2007/0208498 A1 | 9/2007 | Barker et al. | 2008/0233919 A1 | 9/2008 | Kenney | |
| 2007/0218925 A1 | 9/2007 | Islam et al. | 2008/0248815 A1 | 10/2008 | Busch | |
| 2007/0219706 A1 | 9/2007 | Sheynblat | 2008/0249667 A1 | 10/2008 | Horvitz et al. | |
| 2007/0229549 A1 | 10/2007 | Dicke et al. | 2008/0268876 A1 | 10/2008 | Gelfand et al. | |
| 2007/0232272 A1 | 10/2007 | Gonsalves et al. | 2008/0271072 A1* | 10/2008 | Rothschild et al. | 725/35 |
| 2007/0232326 A1 | 10/2007 | Johnson | 2008/0284642 A1 | 11/2008 | Seacat et al. | |
| 2007/0233387 A1 | 10/2007 | Johnson | 2008/0287124 A1 | 11/2008 | Karabinis | |
| 2007/0238491 A1 | 10/2007 | He | 2008/0288166 A1 | 11/2008 | Onishi | |
| 2007/0243853 A1 | 10/2007 | Bumiller et al. | 2008/0293397 A1 | 11/2008 | Gajdos et al. | |
| 2007/0247435 A1 | 10/2007 | Benko et al. | 2008/0310850 A1 | 12/2008 | Pederson et al. | |
| 2007/0254676 A1 | 11/2007 | Pedigo et al. | 2008/0318550 A1 | 12/2008 | DeAtley | |
| 2007/0259674 A1 | 11/2007 | Neef et al. | 2008/0319644 A1 | 12/2008 | Zehler | |
| 2007/0260751 A1 | 11/2007 | Meesseman | 2008/0319652 A1 | 12/2008 | Moshfeghi | |
| 2007/0266116 A1 | 11/2007 | Rensin et al. | 2009/0003659 A1 | 1/2009 | Forstall et al. | |
| 2007/0271328 A1 | 11/2007 | Geelen et al. | 2009/0005005 A1 | 1/2009 | Forstall et al. | |
| 2007/0276586 A1 | 11/2007 | Jeon et al. | 2009/0005018 A1 | 1/2009 | Forstall et al. | |
| 2007/0276587 A1 | 11/2007 | Johnson | 2009/0005021 A1 | 1/2009 | Forstall et al. | |
| 2007/0276596 A1 | 11/2007 | Solomon et al. | 2009/0005068 A1 | 1/2009 | Forstall et al. | |
| 2007/0281664 A1 | 12/2007 | Kaneko et al. | 2009/0005070 A1 | 1/2009 | Forstall et al. | |
| 2007/0282521 A1 | 12/2007 | Broughton | 2009/0005071 A1 | 1/2009 | Forstall et al. | |
| 2007/0282565 A1 | 12/2007 | Bye et al. | 2009/0005072 A1 | 1/2009 | Forstall et al. | |
| 2007/0290920 A1 | 12/2007 | Shintai et al. | 2009/0005076 A1 | 1/2009 | Forstall et al. | |
| 2007/0299601 A1 | 12/2007 | Zhao et al. | 2009/0005080 A1 | 1/2009 | Forstall et al. | |
| 2008/0004789 A1 | 1/2008 | Horvitz et al. | 2009/0005082 A1 | 1/2009 | Forstall et al. | |
| 2008/0004791 A1 | 1/2008 | Sera | 2009/0005964 A1 | 1/2009 | Forstall et al. | |
| 2008/0004802 A1 | 1/2008 | Horvitz | 2009/0005965 A1 | 1/2009 | Forstall et al. | |
| 2008/0005104 A1 | 1/2008 | Flake et al. | 2009/0005975 A1 | 1/2009 | Forstall et al. | |
| 2008/0005301 A1 | 1/2008 | Li et al. | 2009/0005978 A1 | 1/2009 | Forstall et al. | |
| 2008/0015422 A1 | 1/2008 | Wessel | 2009/0005981 A1 | 1/2009 | Forstall et al. | |
| 2008/0021632 A1 | 1/2008 | Amano | 2009/0030605 A1 | 1/2009 | Breed | |
| 2008/0024360 A1 | 1/2008 | Taylor | 2009/0031006 A1 | 1/2009 | Johnson | |
| 2008/0024364 A1 | 1/2008 | Taylor | 2009/0033540 A1 | 2/2009 | Breed et al. | |
| 2008/0027636 A1 | 1/2008 | Tengler et al. | 2009/0042585 A1 | 2/2009 | Matsuda | |
| 2008/0030308 A1 | 2/2008 | Johnson | 2009/0089706 A1 | 4/2009 | Furches et al. | |
| 2008/0032703 A1 | 2/2008 | Krumm et al. | 2009/0098857 A1 | 4/2009 | DeAtley | |
| 2008/0032721 A1 | 2/2008 | MacDonald et al. | 2009/0177385 A1 | 7/2009 | Matas et al. | |
| 2008/0045234 A1 | 2/2008 | Reed | 2009/0197612 A1 | 8/2009 | Kiiskinen | |
| 2008/0046176 A1 | 2/2008 | Jurgens | 2009/0215469 A1 | 8/2009 | Fisher | |
| 2008/0052407 A1 | 2/2008 | Baudino et al. | 2009/0228961 A1 | 9/2009 | Wald et al. | |
| 2008/0065311 A1 | 3/2008 | Bauchot et al. | 2009/0234743 A1 | 9/2009 | Wald et al. | |
| 2008/0070593 A1 | 3/2008 | Altman et al. | 2009/0259573 A1 | 10/2009 | Cheng et al. | |
| 2008/0071466 A1 | 3/2008 | Downs et al. | 2009/0271271 A1 | 10/2009 | Johnson | |
| 2008/0082254 A1 | 4/2008 | Huhtala et al. | 2009/0281724 A1 | 11/2009 | Blumenberg et al. | |
| 2008/0085727 A1 | 4/2008 | Kratz | 2009/0286549 A1 | 11/2009 | Sazegari et al. | |

| | | | |
|---|---|---|---|
| 2010/0082820 A1 | 4/2010 | Furukawa | |
| 2010/0106397 A1 | 4/2010 | Van Essen | |
| 2010/0131584 A1 | 5/2010 | Johnson | |
| 2010/0173647 A1 | 7/2010 | Sheynblat | |
| 2010/0207782 A1 | 8/2010 | Johnson | |
| 2011/0051658 A1 | 3/2011 | Jin et al. | |

FOREIGN PATENT DOCUMENTS

| | | |
|---|---|---|
| CA | 2163215 | 5/1994 |
| CA | 2287596 | 4/2000 |
| CA | 2 432 239 | 12/2004 |
| DE | 3 621 456 | 1/1988 |
| DE | 4437360 | 4/1996 |
| DE | 19506890 | 8/1996 |
| DE | 19914257 | 3/1999 |
| DE | 10 141 695 | 3/2003 |
| EP | 0 288 068 | 7/1992 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 786 646 | 7/1997 |
| EP | 785535 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 672 474 | 6/2006 |
| EP | 1 790 947 | 5/2007 |
| EP | 1 860 904 | 11/2007 |
| EP | 1 933 249 | 8/2008 |
| EP | 1 975 567 | 10/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005-277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | 98/54682 | 12/1998 |
| WO | 99/16036 | 4/1999 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/33533 | 4/2002 |
| WO | WO 02/54813 | 7/2002 |
| WO | WO 03/023593 | 3/2003 |
| WO | WO 2004/008792 | 3/2003 |
| WO | WO 03/096055 | 11/2003 |
| WO | WO 2004/021730 | 3/2004 |
| WO | WO 2004/034194 | 4/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |
| WO | WO 2007/052285 | 5/2007 |
| WO | WO 2008/051929 | 5/2008 |
| WO | WO 2008/085740 | 7/2008 |
| WO | WO 2009/002942 | 12/2008 |
| WO | WO 2009/140031 | 11/2009 |

OTHER PUBLICATIONS

U.S. Appl. No. 11/827,065, filed Jul. 10, 2007, Johnson.
U.S. Appl. No. 11/972,559, filed Jan. 10, 2008, Alten.
U.S. Appl. No. 12/044,363, filed Mar. 7, 2008, Johnson.
U.S. Appl. No. 11/114,714, filed May 2, 2008, Williamson et al.
U.S. Appl. No. 12/119,316, filed May 12, 2008, Blumweberg et al.
U.S. Appl. No. 12/122,339, filed May 16, 2008, Sazegari et al.
U.S. Appl. No. 12/233,358, filed Sep. 18, 2008, Low et al.
U.S. Appl. No. 12/270,814, filed Nov. 13, 2008, Herz.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"Mio 269+ Users Manula"; 2005; 44 pages.
"New program for mobile blogging for PocketPC released: MY BLOG"; [online] [Retrieved on Apr. 5, 2006]; Retrieved from the Internet, URL: http://msmobiles.com/news.php/4067.html.
"Numbering and Dialing Plan within the United States", Alliance for Telecommunications Industry Solutions; 2005; 17 pages.

Review Guide—Google Maps for mobile (beta); Google; 2006; 7 pages.
"User-centered design of mobile solutions", NAMAHN, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.
Anand et al., "Quantitative Analysis of Power Consumption for Location-Aware Applications on Smart Phones", IEEE International Symposium on Industrial Electronics, 2007.
Beard et al., "Estimating Positions and Paths of Moving Objects", IEEE 2000, pp. 1-8.
Berman et al., "The Role of Dead Reckoning and Inertial Sensors in Future General Aviation Navigation", IEEE, 1998, pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.
Binzhuo et al., "Mobile Phone GIS Based on Mobile SVG", IEEE 2005.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7xmlS2r0FZFeu9G4ht.cA; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.
Dibdin, Peter, "Where are mobile location based services?", Dec. 14, 2001, pp. 1-8.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug. 31-Sep. 2, 1994, pp. 473-477.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.
Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.
Ju et al., "RFID Data Collection and Integration based on Mobile Agent", IEEE, 2006.
Kbar et al., "Mobile Station Location based on Hybrid of Signal Strength and Time of Arrival", IEEE, 2005.
Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.
Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Miller et al., "Synchronization of Mobile XML Databases by Utilizing Deferred Views", IEEE 2004.
Nardi et al., "Integrating Communication and Information through Contact Map", Communications of the ACM, vol. 45, No. 4, Apr. 2002.
Northard, "Docking Station Communication Link", IBM TDB, Feb. 1994.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rogers et al., "Adaptive User Interfaces for Automotive Environments", IEEE Intelligent Vehicles Symposium 2000, Oct. 3-5, 2000, pp. 662-667.
Schreiner, "Where We At? Mobile Phones Bring GPS to the Masses", IEEE Computers Society, May/Jun. 2007, pp. 6-11.
Spohrer. "New Paradigms for Using Computers", 1997; retrieved from the Internet, URL: <http://almaden.ibm.com/npuc97/1997/spohrer.htm>.
Sung et al., "Towards Reliable Peer-to-Peer Data Sharing over Mobile Ad hoc Networks", IEEE, 2005.
Weib et al., "Zone services—An approach for location-based data collection", Proceedings of the 8th International Conference on E-commerce Technology and the 3rd IEEE International Conference on Enterprise Computing, E-Commerce and E-Services.
Yang et al., "A Mutlimedia System for Route Sharing and Video-based Navigation", IEEE, 2006, pp. 73-76.
Yang et al. "Global Snapshots for Distributed Debugging", IEEE, pp. 436-440, 1992.
Yanyan et al., "The model of optimum route selection in vehicle automatic navigation system based on unblocked reliability analyses", IEEE 2003.
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

International Search Report and Written Opinion, dated Jun. 9, 2008, issued in Interntiaonal Application No. PCT/US2007/088880, filed Dec. 27, 2007.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Hohman et al., "GPS Roadside Integrated Precision Positioning System", Position Location and Navigation Symposium (IEEE 2000) pp. 221-230.

Samadani et al., "PathMarker: Systems for capturing trips", IEEE (2004) International Conference on Multimedia and Expo., Publication Date: Jun. 27-30, 2004, vol. 3, pp. 2123-2126, 2004.

Budka et al., "A Bayesian method to Improve Mobile Geolocation Accuracy", IEEE, 2002, pp. 1021-1025.

Yamamoto et al., "Position Location Technologies Using Signal Strength in Cellular Systems", IEEE, 2001, pp. 2570-2575.

International Search Report and Written Opinion, dated Oct. 1, 2009, issued in PCT/US2009/041298.

Bederson, B.B., *Audio Augmented Reality: A Prototype Automated Tour Guide* [online] [retrieved on Aug. 30, 2002] [retrieved from http://www.cs.umd.edu/~bederson/papers/chi-95-aar/] pp. 1-4.

*GPS 12 Personal Navigator Owner's Manual & Reference*, Garmin Corporation, Jan. 1999, pp. 1-60.

*FM 3-25.26 Map Reading and Land Navigation* Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

Jain, R., *Potential Networking Applications of Global Positioning Systems (GPS)* [online] [retrieved on Nov. 18, 2008] [retrieved from http://arxiv.org/ftp/cs/papers/9809/9809079.pdf] OSU Technical Report TR-24, Apr. 1996, pp. 1-40.

Rekimoto, J., *Augment-able Reality: Situated Communication through Physical and Digital Spaces*, iswc, pp. 68, Second International Symposium on Wearable computers (ISWC'98), 1998, pp. 1-8.

Rozier, J., *Hear & There: An Augmented Reality System of Linked Audio*, Proceedings of the International Conference on Auditory Display, Atlanta, GA, Apr. 2000, pp. 1-6.

Internet Webpage—Zeppelin Museum Friedrichshafen, Audio Guide [online] [retrieved on Aug. 30, 2002] [retrieved from http://www.zeppelin-musium.de/Text_Audio.en.htm] pp. 1.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

Challe, "CARMINAT-An Integrated information and guidance system," Vehicle Navigation and Information Systems Conference, Oct. 20-23, 1991, Renault—Direction de la Recherche, Rueil-Malmaison, France.

Pungel, "Traffic control-beat the jam electronically," Funkschau, 1988, 18:43-45 (w/English translation).

Rillings and Betsold, "Advanced driver information systems," Vehicular Technology, IEEE Vehicular Technology Society, 1991, 40:31-40.

Tsuzawa and Okamoto, "Advanced Mobile Traffic Information and Communication System," First Vehicle Navigation and Information Systems Conference, Sep. 11-13, 1989, Toronto, Canada, Abstract only.

Wong, "GPS: making roads safer and solving traffic tangles," Asia Engineer, 1995, 23(9):31-32.

Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.

Nagao et al., Walk Navi: A Location-Aware Interactive Navigation/Guideline System and Software III, First edition, pp. 9-48, published by Kindai-Kagaku-Sya Co. Ltd., Dec. 10, 1995.

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_p0aJ1b954T_DQn6gB; 1 page.

Feddema et al., "Cooperative Sentry Vehicles and Differential GPS Leapfrog," 2000, *United States Department of Energy*, pp. 1-12.

Maxwell et al., "Alfred: The Robot Waiter Who Remembers You," *AAAI Technical Report WS-99- 15*, 1999, 12 pages.

Shibata et al., "Development and Integration of Generic Components for a Teachable Vision-Based Mobile Robot," *IEEE/ASME Transactions on Mechatronics*, 1996, 1(3):230-236.

Yogesh C. Rathod, Third Party Submission in U.S. Appl. No. 12/233,358 mailed Mar. 30, 2010, 12 pages.

Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.

Benefon ESC! GSM+GPS Personal Navigation Phone, benefon.com, Copyright 2001, 4 pages.

Freundschuh, "Does 'Anybody' Really Want (or Need) Vehicle Navigation Aids?" First Vehicle Navigation and Information System Conference, Sep. 11-13, 1989, Toronto, Canada, 5 pages.

Gould, "The Provision of Usable Navigation Assistance: Considering Individual Cognitive Ability," First Vehicle Navigation and Information System Conference, Sep. 11-13, 1989, Toronto, Canada, 7 pages.

Mark, "A Conceptual Model for Vehicle Navigation Systems," First Vehicle Navigation and Information System Conference, Sep. 11-13, 1989, Toronto, Canada 11 pages.

Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.

Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.

Hoogenraad, "Location Dependent Services," 3rd AGILE Conference on Geographic Information Science, Helsinki/Espoo, Finland, May 25-27, 2000, pp. 74-77.

Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Burnett, "Usable Vehicle Navigation Systems: Are We There Yet?" Vehicle Electronic Systems 2000, Jun. 29-30, 2000, 3.1.1-3.1.12.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Ni and Deakin, "On-Board Advanced Traveler Information Systems," Dec. 1, 2002, 10 pages.
Serafin et al., "Functions and Features of Future Driver Information Systems," Technical Report UMTRI-91-16, May 1991, 104 pages.
Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.
"LaBarge in joint venture on bus system," Internet: URL: http://www.bizjournals.com/stlouis/stories/1998/08/10/focus2.html?t-printable, Aug. 7, 1998, 1 page.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Brown, "The stick-e document: a framework for creating context-aware applications," Electronic Publishing, 1995, 8:259-272.
Brown, "Triggering Information by Context," Personal Technologies, 1998, 2:18-27.
Dey et al., "CyberDesk: a framework for providing self-integrating context-aware services," Knowledge-Based Systems, 1998, 11:3-13.
Hodes and Katz, "Composable ad hoc location-based services for heterogeneous mobile clients," Wireless Networks, 1999, 5:411-427.
Kreller et al., "A Mobile-Aware City Guide Application," ACTS Mobile Communication Summit, 1998, Rhodes, Greece, 7 pages.
Lusky et al., "Mapping the Present," ColoradoBiz, Nov. 1999, 26(11):16-17.
McCarthy and Meidel, "Activemap: A Visualization Tool for Location Awareness to Support Informal Interactions," HUC '99, LNCS 1707, 1999, pp. 158-170.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Pascoe et al., "Developing Personal Technology for the Field," Personal Technologies, 1998, 2:28-36.
Tarumi et al., "Public Applications of SpaceTag and Their Impacts," Digital Cities, LNCS 1765, 2000, pp. 350-363.
Tebbutt, "Dial your way out of the woods," The Australian, Feb. 2000, 1 page.
Tso et al., "Always on, Always Connected Mobile Computing," Mobile Communications Operation—Mobile Handheld Products Group, 1996, pp. 918-924.
Wang and Lin, "Location Aware Information Agent over WAP," Tamkang Journal of Science and Engineering, 2000, 3(2):107-115.
"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.
"Report on Location Service feature (LCS) 25.923 v1.0.0," TSG-RAN Working Group 2 (Radio layer 2 and Radio layer 3), Berlin, May 25-28, 1999, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"Enabling UMTS / Third Generation Services and Applications," No. 11 Report from the UMTS Forum, Oct. 2000, 72 pages.
"3rd Generation Partnership Project (3GPP); Technical Specification Group (TSG) RAN; Working Group 2 (WG2); Report on Location Services," TS RAN R2.03 V0.1.0, Apr. 1999, 43 pages.
"Revised CR to 09/31 on work item LCS," ETSI SMG3 Plenary Meeting #6, Nice, France, Dec. 13-15, 1999, 18 pages.
Digital cellular telecommunications system (Phase 2+); Location Services (LCS); Service description, Stage 1 (GSM 02.71) ETSI, Apr. 1999, 22 pages.
Akerblom, "Tracking Mobile Phones in Urban Areas," Goteborg University Thesis, Sep. 2000, 67 pages.
Borsodi, "Super Resolution of Discrete Arrivals in a Cellular Geolocation System," University of Calgary Thesis, Apr. 2000, 164 pages.
Abowd et al., "Context-awareness in wearable and ubiquitous computing," 1st International Symposium on Wearable Computers, Oct. 13-14, 1997, Cambridge, MA, 9 pages.
Balsiger et al., "MOGID: Mobile Geo-depended Information on Demand," Workshop on Position Dependent Information Services (W3C-WAP), 2000, 8 pages.
Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.
Cheverst et al., "The Role of Connectivity in Supporting Context-Sensitive Applications," HUC'99, LNCS 1707, 1999, pp. 193-209.
Efstratiou and Cheverst, "Reflection: A Solution for Highly Adaptive Mobile Systems," 2000 Workshop on Reflective Middleware, 2000, 2 pages.
Cheverst et al., "The Support of Mobile-Awareness in Collaborative Groupware," Personal Technologies, 1999, 3:33-42.
Cheverst et al., "Design of an Object Model for a Context Sensitive Tourist Guide," Computers and Graphics, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Exploiting Context to Support Social Awareness and Social Navigation," SIGGROUP Bulleting Dec. 2000, 21(3):43-48.
Cheverst et al., "Services to Support Consistency in Mobile Collaborative Applications," Proc. 3rd International Workshop on Services in Distributed Networked Environments, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems platform for mobile computing," Mobile Networks and Applications, 1998, 3:143-156.

Davies et al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network-based location services," Ericsson Press Release, Oct. 11, 1999, 2 pages.

Fischer et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday et al., "Developing Adaptive Applications: The MOST Experience," J. Integrated Computer-Aided Engineering, 1999, pp. 143-157.

Gunnarsson et al., "Location Trial System for Mobile Phones," IEEE, 1998, pp. 2211-2216.

Jose and Davies, "Scalabe and Flexible Location-Based Services for Ubiquitous Information Access," HUC'99, LNCS 1707, 1999, pp. 52-66.

Klinec and Nolz, "Nexus-Positioning and Communication Environment for Spatially Aware Applications," IAPRS, Amsterdam, 2000, 7 pages.

Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.

Kreller et al., "UMTS: A Middleware Architecture and Mobile API/Approach," IEEE Personal Communications, Apr. 1998, pp. 32-38.

Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.

Kyriazakos et al., "Optimization of the Handover Algorithm based on the Position of the Mobile Terminals," Communications and Vehicular Technology, Oct. 2000, pp. 155-159.

Leonhardt and Magee, "Multi-Sensor Location Tracking," MOBICOM 98, Dallas, TX, pp. 203-214.

Leonhardt and Magee, "Towards a general location service for mobile environments," Proc. Third International Workshop on Services in Distributed and Networked Environments, Jun. 3-4, 1996, 8 pages.

Long et al., "Rapid Prototyping of Mobile Context-Aware Applications: The Cyberguide Case Study," MobiCom '96, 1996, 11 pages.

Yokote, "The Apertos Reflective Operating System: The Concept and Its Implementation," OOPSLA'92, pp. 414-434.

Popescu-Zeletin et al., "Applying Location-Aware Computing for Electronic Commerce: Mobile Guide," Proc. 5th Conference on Computer Communications, AFRICOM-CCDC'98, Oct. 20-22, 1998, 14 pages.

Zhao, "Mobile Phone Location Determination and Its Impact on Intelligent Transportation Systems," IEEE Transactions on Intelligent Transportation Systems, Mar. 2000, 1(1):55-64.

Microsoft Outlook 2003 User's Guide, http://opan.admin.ufl.edu/user_guides/outlook2003.htm. Aug. 2004, 17 pages.

"Error: could not find a contact with this e-mail address." Outlookbanter.com. Dec. 2006, 12 pages.

US 6,731,928, 05/2004, Tanaka (withdrawn)
US 7,254,416, 08/2007, Kim (withdrawn)

* cited by examiner

LOCATION BASED MEDIA ITEMS

CROSS-REFERENCE TO RELATED APPLICATION

This application claims priority to U.S. Provisional Patent Application Ser. No. 60/946,840 filed Jun. 28, 2007, and entitled "LOCATION BASED MEDIA ITEMS" the contents of which are incorporated herein by reference.

BACKGROUND

This disclosure relates to navigation using a mobile device.

Navigation systems provide little intelligence other than the ability to navigate from an origination point to a destination point. Often such navigation systems are implemented on hand-held devices, and a user may utilize such a system in unfamiliar surroundings, e.g., while walking through a city the user is visiting during a vacation. Because most navigation interfaces on the hand-held device typically provide only a map and/or directions to the user, the user may not experience interesting locations nearby; e.g., the user may walk past a historical location, unaware of the significance.

Some navigation systems can provide data related to locations nearby a user. However, the provisioning of such location data can result in a cluttered navigation interface, e.g., a user may have a navigation interface set to display several city blocks, but the interface may be cluttered by multiple alerts related to interesting locations outside the boundary displayed on the navigation interface. Furthermore, the location data that is received may be of little interest to the user, e.g., a user may be interested in historical locations, but may receive data related to non-historical locations that are not of immediate interest to the user. The provision of such data can result in a poor user experience.

SUMMARY

In one aspect, systems, methods, apparatuses and computer program products are provided. In one aspect, methods are disclosed, which include steps such as: communicating location information associated with a device to a server, the location information including boundary information defining a geographic area depicted by a current map display associated with the device; receiving at the device media items from the server, the media items comprising vicinity content associated with the location information, the vicinity content comprising content associated with the geographical area defined by the boundary information; and, presenting the media items received at the device to a user.

In another aspect, methods are disclosed, which include steps such as: receiving current location information associated with a current location of a mobile device, the current location information including boundary information defining a geographic area depicted by a current map display associated with the device; filtering a plurality of media items based on a geographic area defined by the boundary information identified by the location information, the media items comprising content associated with the geographic area defined by the boundary information; and, transmitting the media items to the mobile device for presentation.

Systems can include a positioning system, a preferences engine, a communications interface, and a user interface. The positioning system derives location information associated with an associated device, while the preferences engine can receive and store preferences associated with a user of the device. The communications interface can communicate preferences and location information associated with the device to a server. The communications interface can also receive media items including content based on the preferences and based on location information. The user interface can present the media items to a user associated with the device.

Other systems can include a communications interface and a location based media engine. The communications interface receives location information associated with a current location of a mobile device and to receive user preferences, while the location based media engine identifies media items based on user preferences and on a geographic area proximate to the mobile device, the media items including content associated with the geographic area and identified by the user preferences. The communications interface can then communicate the media items to the mobile device for presentation to a user associated with the mobile device.

Systems and methods as described can enhance the data provided by a mobile navigation system. Location based media items can provide multimedia tours for sightseers. Location based media can also provide route, photo and video sharing among users, and can provide media of local interest to users enhancing their understanding of local life and culture.

DETAILED DESCRIPTION

Figure 1:
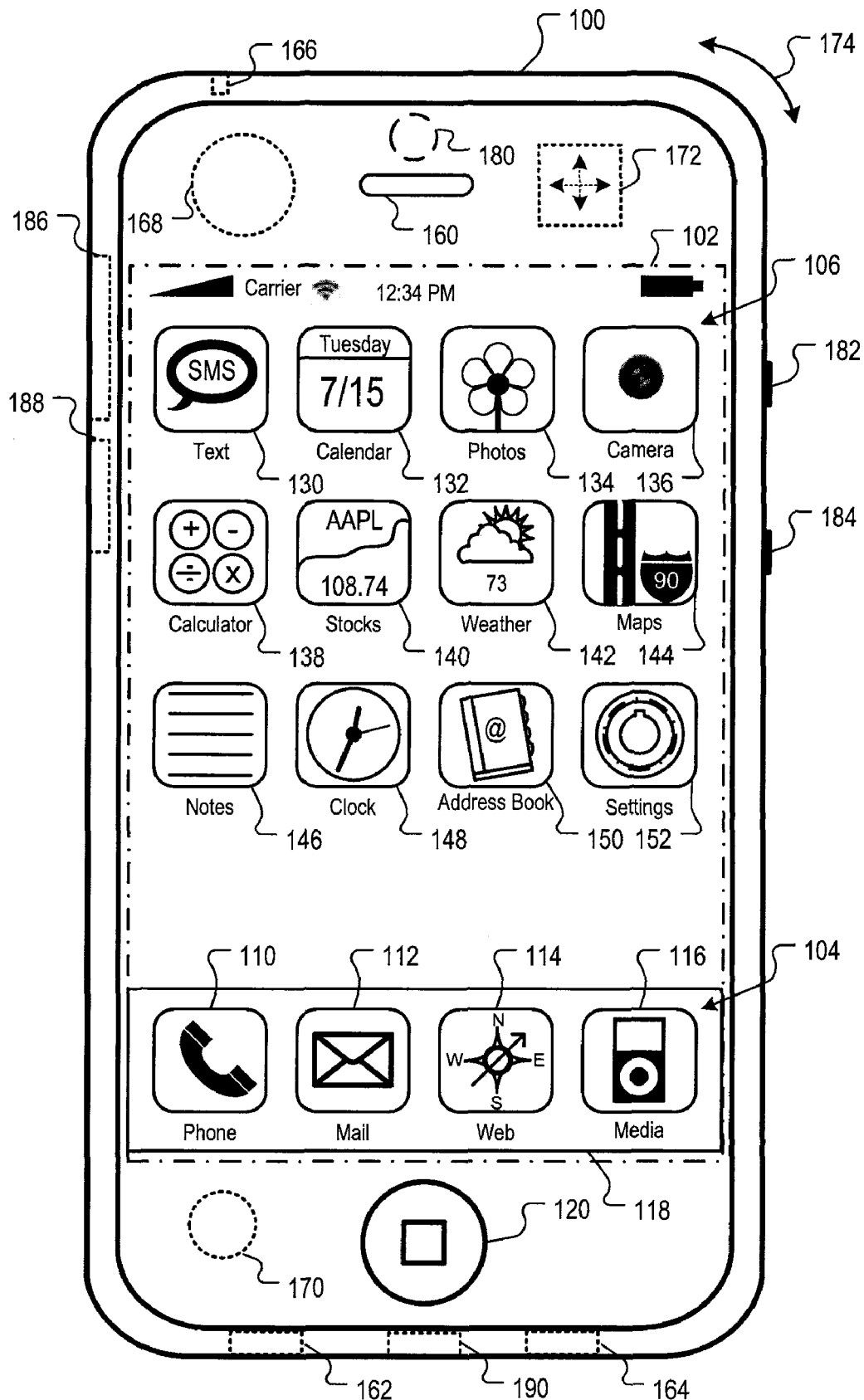
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
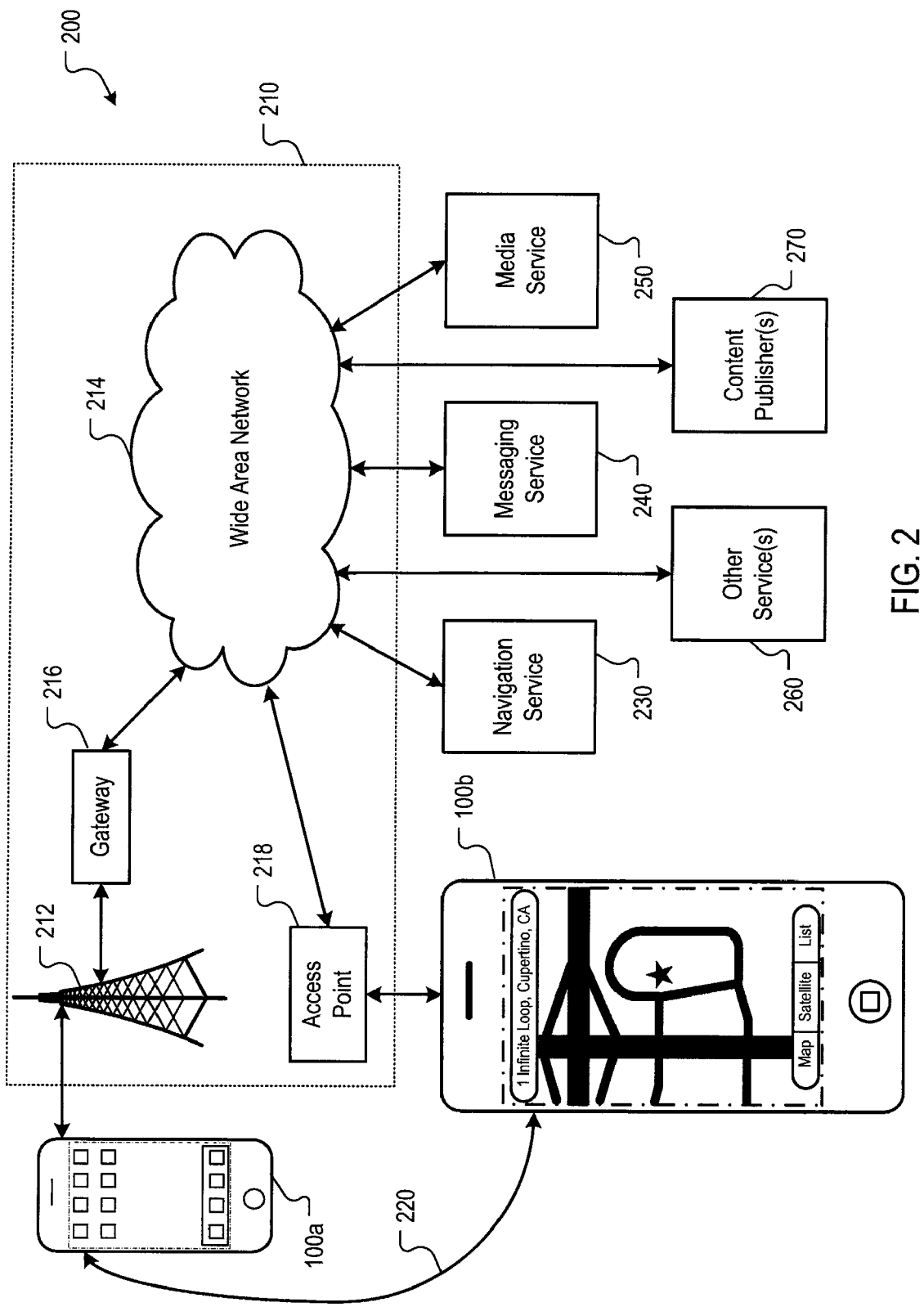
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point device 218, such as an 802.11g wireless access point device, can provide communication access to the wide area network 214. In some implementations, both voice and data communications can be established over the wireless network 212 and the access point device 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point device 218 and the wide area network 214. In some implementations, the mobile device 100 can be physically connected to the access point device 218 using one or more cables and the access point device 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Exemplary Mobile Device Architecture

Figure 3:
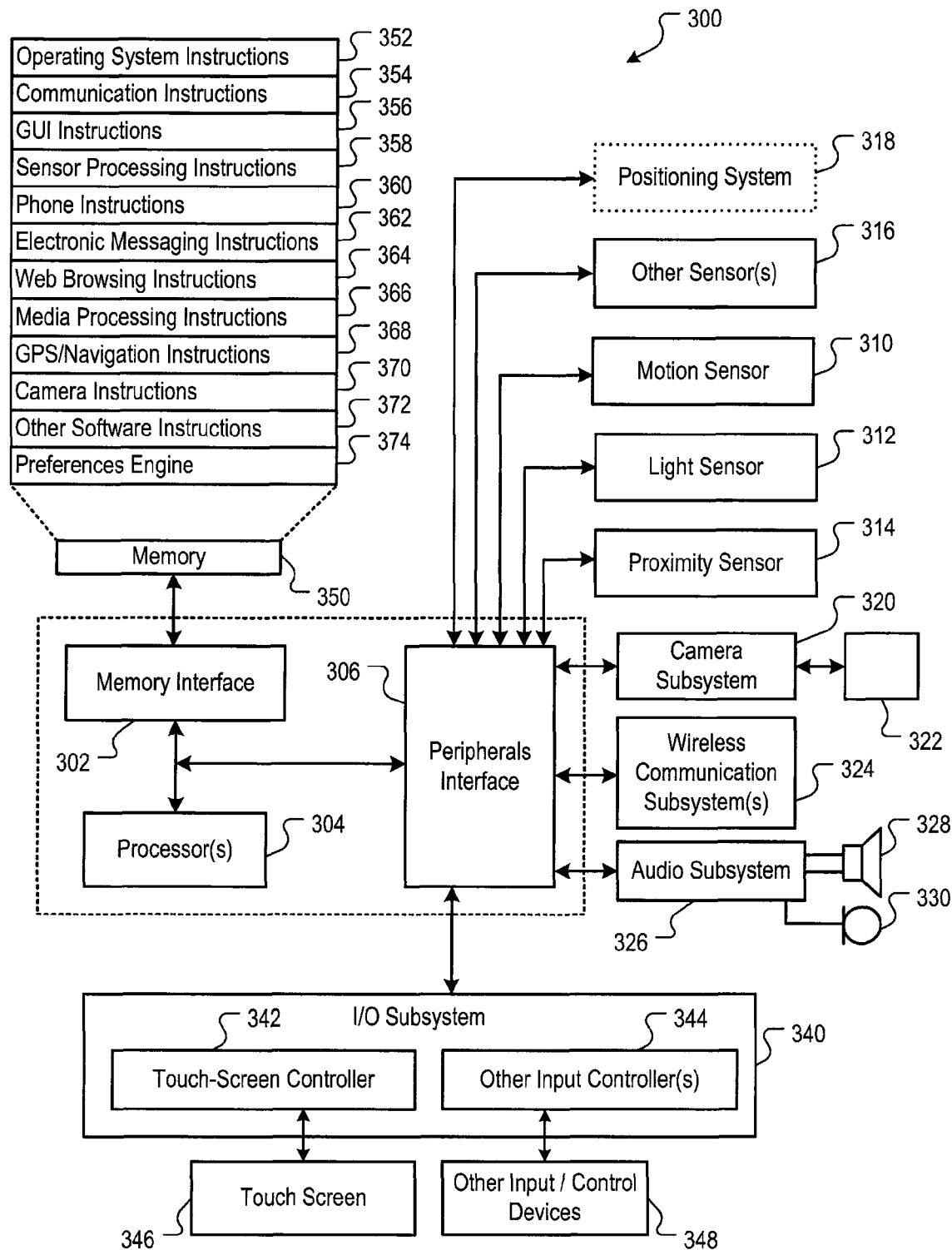
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some embodiments, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

The memory 350 can also include a preferences engine 374. The preferences engine 374 can be operable to receive user preferences as to the sorts of media items the user is interested. In some implementations, the preferences can be used to filter the sorts of information that is sent to the mobile device 100. For example, the user might indicate a preference for local music. Thus, when local music is available the mobile device 100 can retrieve available local music. In another example, the user might indicate a preference not to receive video, route or image content when in a specified area (e.g., hometown, familiar city, etc.), but to receive route and image content when outside of their specified area. These preferences can be communicated to a media service (e.g., media service 250 of FIG. 2), and can be used by the media service to provide relevant media content based on location and/or preferences.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4:
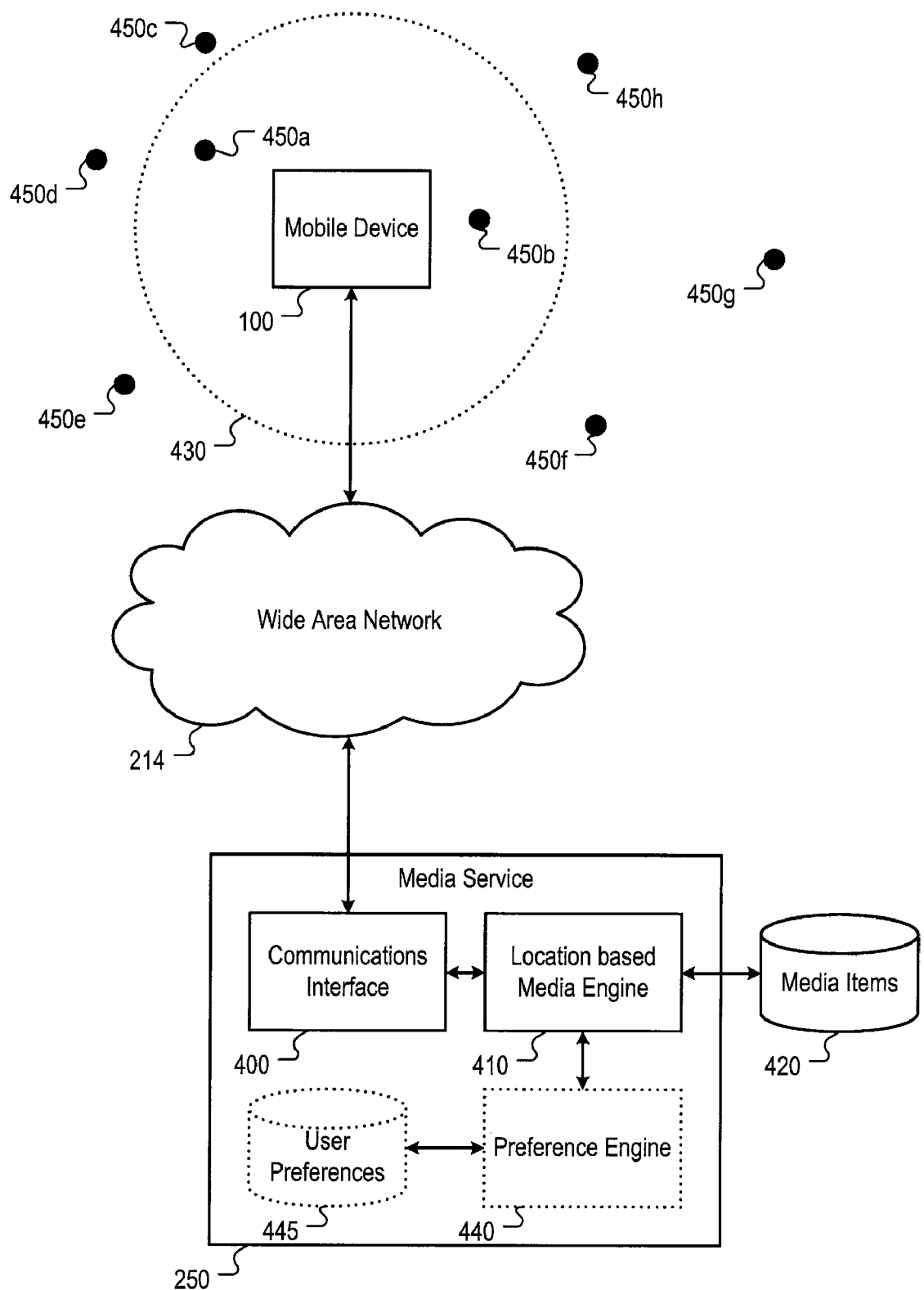
FIG. 4 is a block diagram illustrating an example media service including location based media items.

FIG. 4 is a block diagram illustrating an example media service 250. In some implementations, the media service can include a communications interface 400 and a location based media engine 410. In an implementation, the communications interface 400 can receive position information from a mobile device 100.

Upon receiving position information from the communications interface, the location based media engine 410 can retrieve candidate media items associated with the position information received from the mobile device 100. These candidate media items can be retrieved from a media item store 420. In some implementations, the media items can be retrieved based upon tagging information associated with the media items. The tagging information can identify a location associated with the media items, and determine whether the tagging information defines a location within a proximate area 430 to the mobile device. For example, media items 450a-450h might be available on the media items store 420. Media items 450c-450h are associated with locations outside of the proximate area 430 to the mobile device 100. Thus, these media items 450c-450h are not served to the mobile device 100. However, media items 450a, 450b are associated with locations inside of the proximate area 430. Thus, these media items 450a, 450b are served to the mobile device 100.

Although a circular proximate area 430 is shown, other proximate areas can also be defined. In some implementations, the proximate area 430 can correspond to a current display boundary displayed on the mobile device 100. In other implementations, the proximate area 430 can be user defined.

In other implementations, the device 100 can retrieve a list of media items associated with the proximate area 430 from the media service 250. The device 100 can then compare the list of media items with media items already present on the device. For example, the device may be located at the Statue of Liberty, and other users may have associated certain patriotic songs, including "Stars and Stripes Forever" with the location. The device can review its local storage for the song before downloading the song from the server. In another example, the map can display a location associated with a calendar appointment from one or more calendars stored locally or remotely and associated with one or more users of the device.

In further implementations, the media service 250 might send particular genre or local character/sights information to the device. The device can then use the genre or local character/sights information to identify whether the device includes any locally stored media items which correspond to the genre or local character/sights information. For example, the device can store pictures. The pictures might be tagged with a location, genre or characteristic associated with the subject of the picture. So, if the user were standing at the Statue of Liberty, the device can receive genre, character, sights information that might include keywords like "Statue of Liberty," "New York City," etc. The device could then search the local date store to identify local media items associated with the keywords, such as an old picture of the Statue of Liberty taken during a previous trip to New York City. In other implementations, the device might include the ability to compare locally stored photos with a characteristic photo associated with a location to determine whether the local device includes any locally stored media items associated with the current location.

In various implementations, the user can cause the mobile device 100 to enter a state in which the mobile device 100 alerts the media service 250 that the user would like to receive local media content, or notification of available local media content (e.g., such as when the user is sightseeing, hiking, on vacation, etc.). The user can also cause the mobile device 100 to enter a state in which the mobile device 100 alerts the media service 250 that the user does not want to receive local media content, or notification of available local media content (e.g., such as when the user is driving to/from work, in the grocery store, etc.).

In some implementations, the media content 450a-h can be supplied by other users. For example, a user might be standing at the Washington Monument taking a picture of the monument and decide that they would like to share the picture with other users. The picture can be automatically tagged with the location information and uploaded to the media service 250 for storage in the media item store 250. Similarly, a local band that often performs at a venue location might decide to make their music available to users that are within the proximate area 430 of the venue location and upload their songs to the media service 250.

In other implementations, the media content 450a-h can be commercial content supplied by vendors (e.g., content providers). In such implementations, the media service 250 can include a payment engine operable to collect payment from users and distribute payment to vendors. For example, a tour company might decide to make audio walking tours available for sale to users by uploading tour data to the media service 250. The user can be alerted to the price of the tour, and the mobile device 100 can provide account information, which can be used by the payment engine to collect payment from the user. For example, a user walking through downtown Boston may be alerted that an audio walking tour starting at a location within the proximate area 430 is available for $0.99. If the user decides to purchase the tour, an account associated with the user can be charged a $0.99 fee.

Figure 5:
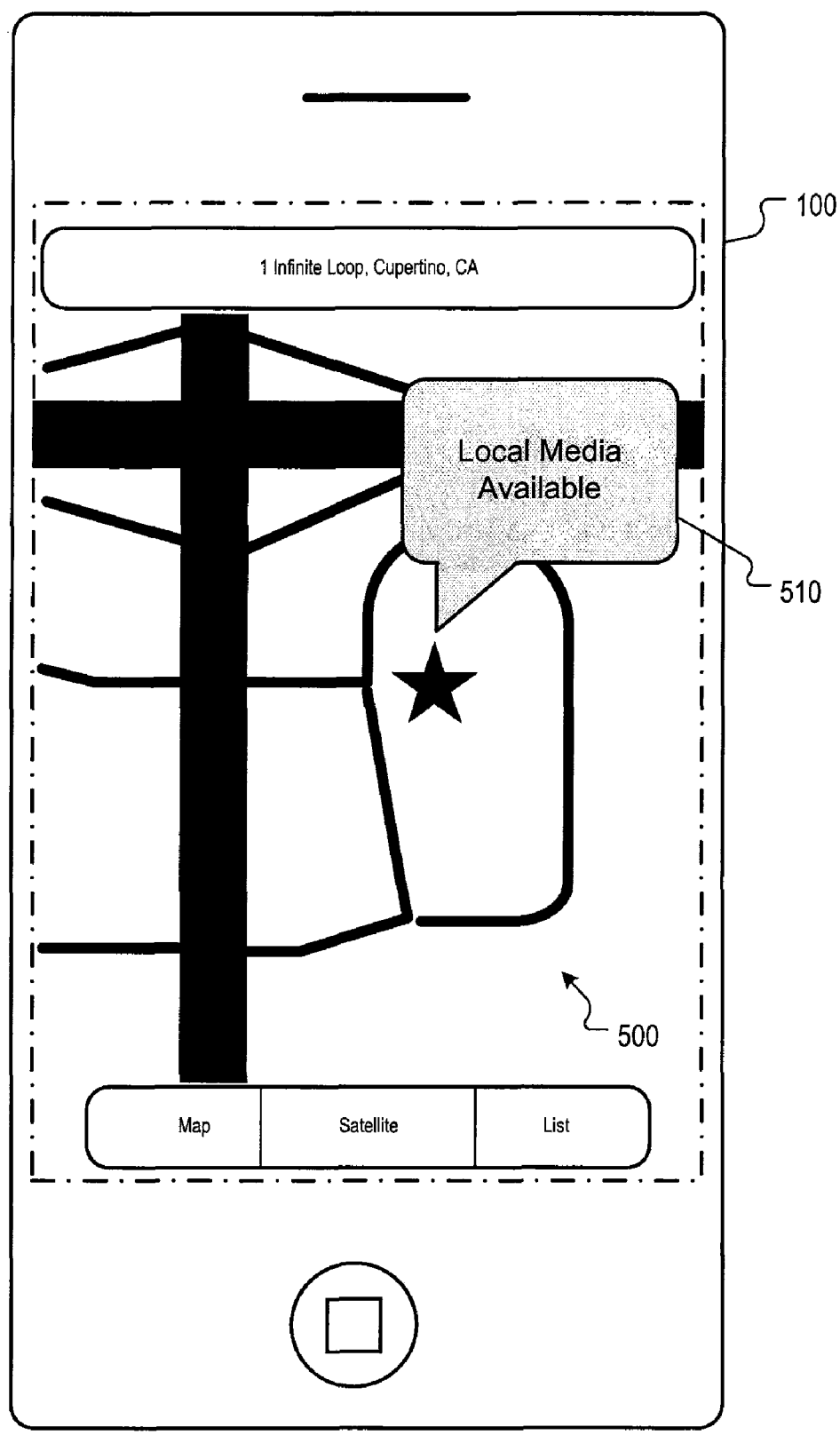
FIG. 5 is a block diagram of an example mobile device using a location based media service.

In some implementations, the media content 450a-h can be overlaid onto a map provided by a navigation service (e.g., navigation service 230), such as shown in FIG. 5. Such overlay can provide notification to the user of available media items. The location of media items can be marked by pushpin, for example. Thus, as the user is navigating using the navigation service, the user can be notified when a media item is available in a proximate area. In some implementations, the notification can provide an indication of what sorts of media items are available (e.g., photos, videos, music, routes, multimedia tours, etc.), whether the media items are user contributed or commercial, and/or how many media items are available, among others.

In some implementations, media content 450 can be provided based on a user preference. For example, a user may set a preference on the mobile device 100 to indicate the user is interested in historical subjects. Accordingly, the mobile device 100 might only display media content 450 that relates only to historical subjects, e.g., the media content 450a may be displayed if it relates to a historical monument, while the media item 450b might not be displayed if it relates to another user's review of a nearby restaurant. Subject matter relations can, for example, be stored in the media item store 420.

In further implementations, the media service 250 can include a preference engine 440 operable to store user preferences in a user preference store 445. Preferences can be stored such that when a user requests media, the media service 250 provides the user with media that is relevant to the user's interests. Thus, in some implementations, the mobile device sends preference information only when there is a change to existing preference information, and the media service 250 stores the preference information for any subsequent communication of media items.

FIG. 5 is a block diagram of an example mobile device using a location based media service. The mobile device 100 can receive a map representation 500 from a navigation service (e.g., navigation service 230 of FIG. 2). The media service 250 can cause a pushpin representation 510 to be overlaid onto the map representation 500 by the mobile device 100. The pushpin representation 510 can be used to notify the user that local media is available. In some implementations, a proximate area (e.g., proximate area 430 of FIG. 4) can be adjusted based on the zoom level associated with the map representation 500 currently displayed to the user. For example, the proximate area 430 may be defined by the display boundary of the map representation 500.

Figure 6:
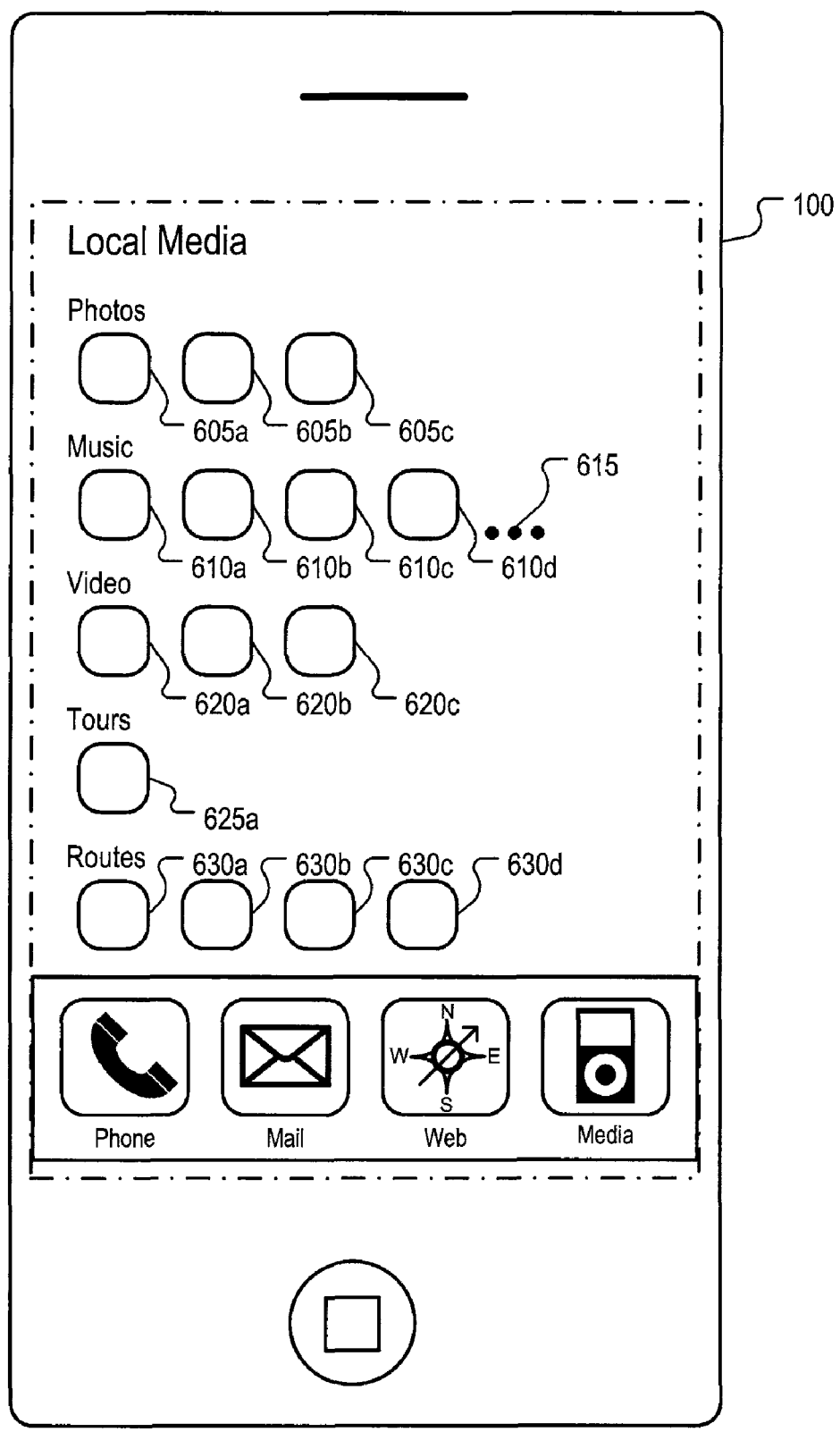
FIG. 6 is a block diagram of another example mobile device using a location based media service.

FIG. 6 is a block diagram of another example mobile device 100 using a location based media service. The mobile device 100, upon selection of a pushpin, for example, can cause available media item abstracts (e.g., icons) to be presented to the user. In some implementations, the media item abstracts can be grouped by category. For example, photo item abstracts 605a-c, music item abstracts 610a-d, video item abstracts 620a-c, tours 625a, and routes 630a-d can be respectively grouped together. In some implementations, a user can select from among the media item abstracts by touching a desired media item abstract. The mobile device 100 can then retrieve the content associated with the media item abstract from a media service (e.g., media service 250) and display the content of the media item to the user.

Other presentations of the media item abstracts can also be used. For example, the abstracts can be grouped by subject matter, e.g., history, entertainment, dining, etc., or can be grouped by date, e.g., added today, added within the last week, etc.; or can be grouped by users or entities, etc.

Figure 7:
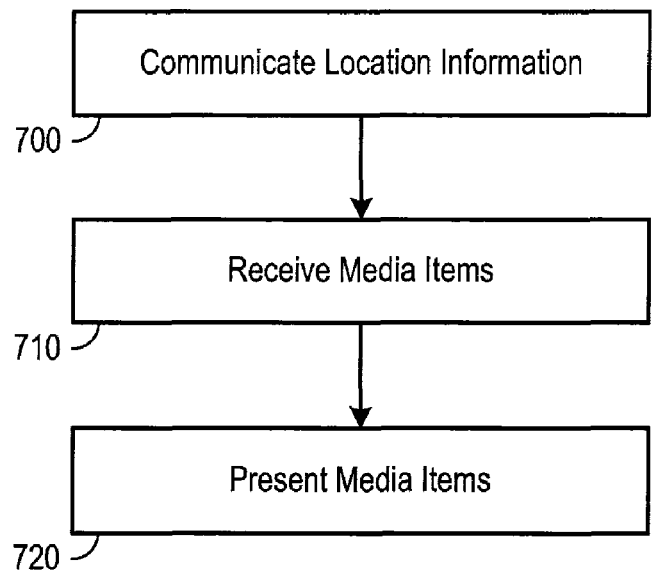
FIG. 7 is a flowchart illustrating an example method for retrieving location based media items.

FIG. 7 is a flowchart illustrating an example method for retrieving location based media items. At stage 700, location information is communicated. The location information can be communicated, for example, by a mobile device (e.g., mobile device 100 of FIG. 1) in conjunction with a positioning system (e.g., positioning system 318 of FIG. 3) and communication instructions (e.g., communication instructions 354 of FIG. 3) operating in conjunction with a wireless communication system (e.g., wireless communication subsystem 324 of FIG. 3). The location information can be communicated to a server (e.g., media services 250 of FIG. 2), for use in locating location based media items. The location information can include boundary information associated with the mobile device. The boundary information can define a geographic area depicted by a current map display associated with the mobile device. The location based media items can be filtered, for example, based on the location information associated with the location information.

At optional stage 710, user preferences can be communicated. The user preferences can be communicated, for example, by a mobile device (e.g., mobile device 100 of FIG. 1) in conjunction with a preferences engine (e.g., preferences engine 374 of FIG. 3) operating in conjunction with a wireless communication system (e.g., wireless communication subsystem 324 of FIG. 3). In some implementations, the preference information can include information such as what types of media a user associated with the mobile device is interested in receiving. Thus, the user can set up the mobile device to receive only certain kinds of media content.

At stage 720, media items are received. Media items can be received, for example, by the mobile device (e.g., mobile device 100) operating in conjunction with communication instructions (e.g., communication instructions 354 of FIG. 3) and the wireless communication subsystem (e.g., wireless communication subsystem 324 of FIG. 3). In some implementations, the media items can be those media items which are associated with an area proximate to the mobile device. In additional implementations, the mobile device can further filter the media items based on preferences of a user associated with the mobile device.

At stage 730, the media items are presented. The media items can be presented, for example, by the mobile device (e.g., mobile device 100) operating in conjunction with graphical user interface instructions (e.g., GUI instructions 356 of FIG. 3) along with a touch screen (e.g., touch screen 346 of FIG. 3) and/or an audio subsystem (e.g., audio subsystem 326 of FIG. 3). The presentation of the media items can be based upon user input received using the touch screen user interface. For example, a user might be prompted by the mobile device whether to present the media item(s).

In some implementations, the method can restart when the user selects to change the scale of the map or is moving such that the map window changes. For example, if a user instructs the mobile device to zoom out, the media items provided to the user based on the original boundaries will not include any media items added by the new zoom level. In some implementations, a mobile device can transmit a boundary delta to a media service. The media service can then identify only those additional media items which are implicated by the change in scale or movement of the map window.

Figure 8:
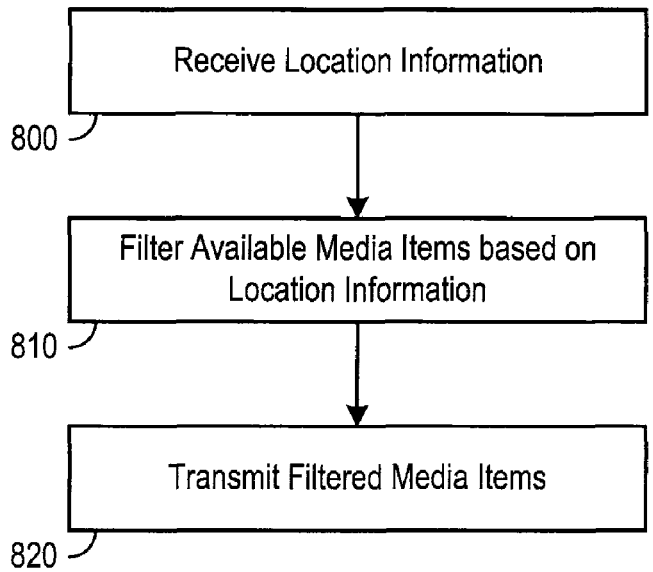
FIG. 8 is a flowchart illustrating another example method for distributing location based media items.

FIG. 8 is a flowchart illustrating another example method for distributing location based media items. At stage 800, location information is received. The location information can be received, for example, by a communications interface (e.g., communications interface 400 of FIG. 4). In some implementations, the location information can include an exact location of a mobile device (e.g., mobile device 100 of FIG. 1). In other implementations, the location information can include an approximate location of the mobile device. In still further implementations, the location information can include information about a currently viewed section of map. Other scales associated with location information are possible.

At optional stage 810, user preferences can be received. The user preferences can be received, for example, by a communications interface (e.g., communications interface 400 of FIG. 4). In some implementations, the preference information is associated with a user of a mobile device, and includes information such as what types of media a user associated with a mobile device is interested in receiving.

At stage 820, the available media items are filtered based on the received location information. The available media items can be filtered, for example, using a location based media engine (e.g., location based media engine 410 of FIG. 4) in conjunction with a media item store (e.g., media item store 420 of FIG. 4). The media items stored in the media items store can include location tagging information, associating the media items with a location. If the location is within a proximate area to the location information associated with the mobile device, the media items are made available to the mobile device. The media items can include both commercial and non-commercial content. In some implementations, the non-commercial content can include content provided by users (e.g., peer contributed content).

In some implementations, the available media items can also be filtered based on preference information. For example, a user might indicate a preference to only receive media items during specified times, at specified locations, during route guidance, etc. A user might further indicate preferences based on the type of content available. For example, a user might only be interested in video content associated with current location information.

At stage 830, the filtered media items are transmitted. The filtered media items can be transmitted, for example, by a communications interface (e.g., communications interface 400). In various implementations, the transmission can be wireless or wire based. The transmission of the media items, in some implementations, includes only transmission of abstract information associated with the media items (e.g., icons) to improve performance. Thus, the content associated with the media item might only be downloaded when the user requests the content. In other implementations, the entire content of each of the media items is transferred to the mobile device, and the mobile device provides the user with an interface to navigate the media items.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method comprising:
    determining, at a mobile device, boundary information defining a geographic area depicted by a current map display associated with the mobile device;
    communicating location information associated with the mobile device to a server, the location information including the boundary information;
    receiving, at the mobile device, media item abstracts representing content comprising photos, videos, audio, routes, commercial content, or tours, the media item abstracts being associated with a location within the geographical area defined by the boundary information;
    associating the received media item abstracts with two or more groups by category;
    displaying two or more groups of the received media item abstracts on the current map display;
    receiving, at the mobile device, input selecting one of the displayed groups of received media item abstracts;
    determining that at least one item of content associated with the selected group of media item abstracts is not stored on the mobile device;
    based on determining that the at least one item of content is not stored on the mobile device, requesting the at least one item of content from the server;
    receiving, at the mobile device, the at least one item of content associated with the selected group of media item abstracts; and
    providing access to content associated with the selected group of media item abstracts, including the at least one item of content, on the mobile device.

2. The method of claim 1, wherein the received content comprises images of locations associated with the geographical area within a proximate distance to the mobile device based on the location information.

3. The method of claim 1, wherein the received content comprises videos associated with the geographical area within a proximate distance to the mobile device based on the location information.

4. The method of claim 1, wherein the received content comprises routes associated with the geographical area within a proximate distance to the mobile device based on the location information.

5. The method of claim 1, wherein the received content comprises a multimedia tour presentation associated with the geographical area within a proximate distance to the mobile device based on the location information.

6. The method of claim 1, wherein the received content comprises music associated with the geographical area within a proximate distance to the mobile device based on the location information.

7. The method of claim 1, further comprising receiving location information from a positioning system.

8. The method of claim 7, wherein the positioning system derives location information from satellite data received from a plurality of satellites.

9. The method of claim 7, wherein the positioning system uses dead reckoning to derive location information associated with the user.

10. The method of claim 7, wherein the positioning system uses a wireless signal strength of a mobile device associated with the user to derive location information associated with the user.

11. The method of claim 1, further comprising presenting the received content in a multi-touch environment.

12. The method of claim 1, further comprising:
    receiving at the mobile device from a user a scale request;
    determining a boundary information delta based on the scale request; and
    retrieving only those media item abstracts associated with the boundary information delta.

13. The method of claim 1, further comprising:
    deriving new location information;
    determining a boundary information delta based on the scale request; and
    retrieving only those media item abstracts associated with the boundary information delta.

14. The method of claim 1, further comprising:
    transmitting preference data associated with the user of the mobile device to the server, and wherein the received media item abstracts are identified based on the transmitted preference data.

15. The method of claim 1, wherein determining that at least one item of content associated with the selected group of media item abstracts is not stored on the mobile device comprises:
    comparing the group of media item abstracts to media items currently stored on the mobile device; and
    determining that the at least one of the group of media item abstracts does not have a corresponding media item stored on the mobile device.

16. A computer-implemented method comprising:
    receiving, from a mobile device, current location information associated with a current location of the mobile device, the current location information including boundary information determined at the mobile device, the boundary information defining a geographic area depicted by a current map display associated with the mobile device;
    identifying a plurality of media item abstracts representing content comprising photos, videos, audio, routes, commercial content, or tours, the media item abstracts being associated with a location within the geographical area defined by the boundary information;

grouping the identified media item abstracts into two or more groups by category;

transmitting the grouped media item abstracts to the mobile device;

receiving, from the mobile device, information identifying content associated with one of the groups of transmitted media item abstracts that was selected by a user of the mobile device and that was determined to not be currently stored on the mobile device; and transmitting, to the mobile device, the content associated with the selected group of media item abstracts that is not currently stored on the mobile device.

17. The method of claim 16, further comprising:

retrieving one or more user preferences associated with a user of the mobile device; and filtering the plurality of grouped media item abstracts based on the one or more user preferences and based upon the location within the geographical area defined by the boundary information, the media item abstracts representing content identified by user preferences and associated with the geographic area.

18. The method of claim 16, wherein the content comprises one or more of a music item, a video item, a multi-media tour presentation item, a picture item, or a route item.

19. The method of claim 16, wherein the content comprises traffic information.

20. The method of claim 16, further comprising:

receiving user-defined content; and adding media item abstracts representing the user-defined content to the plurality of media item abstracts.

21. The method of claim 20, wherein the user-defined content is received using a web interface.

22. The method of claim 16, further comprising:

retrieving content from third party content providers; and adding media item abstracts representing the retrieved content to the plurality of media item abstracts.

23. A system comprising:

a processor; and a computer-readable medium coupled to the processor and having instructions stored thereon, which, when executed by the processor, causes the processor to perform operations comprising:

obtaining location information associated with a mobile device, the location information including boundary information defining a geographic area depicted by a current map display associated with the mobile device;

receiving and storing preferences associated with one or more categories of content comprising photos, videos, audio, routes, commercial content, or tours;

communicating the preferences and the location information associated with the mobile device to a server;

receiving media item abstracts from the server based on the preferences and the location information, wherein the media item abstracts represent content associated with a location within the geographical area defined by the boundary information;

associating the received media item abstracts with two or more groups by category;

overlaying the two or more groups of the received media item abstracts onto the map display;

receiving, at the mobile device, input selecting one of the overlaid groups of received media item abstracts;

determining that at least one item of content associated with the selected group of media item abstracts is not stored on the mobile device;

based on determining that the at least one item of content is not stored on the mobile device, requesting the at least one item of content from the server;

receiving, at the mobile device, the at least one item of content associated with the selected group of media item abstracts; and providing access to content associated with the selected group of media item abstracts, including the at least one item of content, on the mobile device.

24. The system of claim 23, wherein the received content comprises one or more of video content, picture content, audio content, multimedia content or routing content associated with the geographical area within a proximate distance to the mobile device based on the location information.

25. The system of claim 23, wherein the received content comprises user contributed content associated with the geographical area within a proximate distance to the mobile device based on the location information.

26. The system of claim 23, wherein the received content comprises commercial content associated with the geographical area within a proximate distance to the user based on the location information.

27. The system of claim 26, wherein the operations further comprise:

adjusting an account associated with the user based on receiving a request for commercial content; and adjusting an account associated with a provider of the commercial content.

28. The system of claim 23, wherein the location information is derived from satellite data received from a plurality of satellites.

29. The system of claim 23, wherein the positioning system uses dead reckoning to derive location information associated with the user.

30. The system of claim 23, wherein the positioning system uses a wireless signal strength associated with the mobile device to derive location information associated with the mobile device.

31. A system comprising:

a processor; and a computer-readable medium coupled to the processor and having instructions stored thereon, which, when executed by the processor, causes the processor to perform operations comprising:

receiving location information associated with a current location of a mobile device and user preferences associated with the user of the mobile device, the location information including boundary information defining a geographic area depicted by a current map display associated with the mobile device, the boundary information determined at the device;

identifying one or more media item abstracts representing content comprising photos, videos, audio, routes, commercial content, or tours, the media item abstracts being associated with a location within the geographical area defined by the boundary information, wherein the one or more media item abstracts are identified based on the one or more user preferences;

associating the received media item abstracts with two or more groups by category;

generating an overlay of the two or more groups of the received media item abstracts;

communicating the generated overlay to the mobile device for presentation on the map display associated with the mobile device;

receiving, from the mobile device, information identifying content associated with one of the overlaid groups of received media item abstracts that was selected by a user of the mobile device and that was determined to not be currently stored on the mobile device; and transmitting, to the mobile device, the content associated with the selected group of media item abstracts that is not currently stored on the mobile device.

32. The system of claim 31, wherein the content comprises one or more of a music item, a video item, a multi-media tour presentation item, a picture item, or a route item.

33. The system of claim 31, wherein the content comprises one or more of user contributed content or commercial content.

34. The system of claim 31, wherein the content comprises traffic information associated with roads proximate to the location identified by the location information.

35. The system of claim 31, wherein the operations further comprise:
adjusting an account associated with the user based on receiving a request for commercial content; and
adjusting an account associated with a provider of requested commercial content.

36. The system of claim 31, wherein the operations further comprise:
storing the user preferences associated with the user of the mobile device.

37. The system of claim 31, wherein the location information comprises a route and the one or more media item abstracts are identified based upon being associated with a geographic location proximate to the route.

38. A method comprising:
communicating route information associated with a mobile device to a server, the route information comprising an origin and a destination, the route information determined at the mobile device;

receiving at the mobile device media item abstracts from the server, the media item abstracts representing content comprising photos, videos, audio, routes, commercial content, or tours, the media item abstracts being associated with vicinity content related to the route information, the vicinity content comprising content associated with a geographical area proximate to a route associated with the route information;

associating the received media item abstracts with two or more groups by category;

presenting two or more groups of the received media item abstracts received at the mobile device on a map display;

receiving, at the mobile device, input selecting one of the displayed groups of media item abstracts;

determining that at least one item of content associated with the selected group of media item abstracts is not stored on the mobile device;

based on determining that the at least one item of content is not stored on the mobile device, requesting the at least one item of content from the server;

receiving, at the mobile device, the at least one item of content associated with the selected group of media item abstracts; and presenting content associated with the selected group of media item abstracts, including the at least one item of content, on the mobile device.

39. The method of claim 38, further comprising:
receiving the route associated with the route information from the server; and
presenting the route received at the mobile device on the map display, wherein presenting the media item abstracts comprises overlaying symbols associated with the content on a map associated with the route.

40. The method of claim 38, wherein the content comprises user contributed content, wherein the user contributed content is contributed by other users and associated with a location.

* * * * *

UNITED STATES PATENT AND TRADEMARK OFFICE
CERTIFICATE OF CORRECTION

| | |
|---|---|
| PATENT NO. | : 8,332,402 B2 |
| APPLICATION NO. | : 12/020202 |
| DATED | : December 11, 2012 |
| INVENTOR(S) | : Forstall et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this
Eleventh Day of November, 2014

Michelle K. Lee
*Deputy Director of the United States Patent and Trademark Office*